April 6, 1943.　　　　　　J. W. STILES　　　　　　2,315,880
CONVEYER FEEDING SYSTEM
Filed April 14, 1942　　　　3 Sheets—Sheet 1
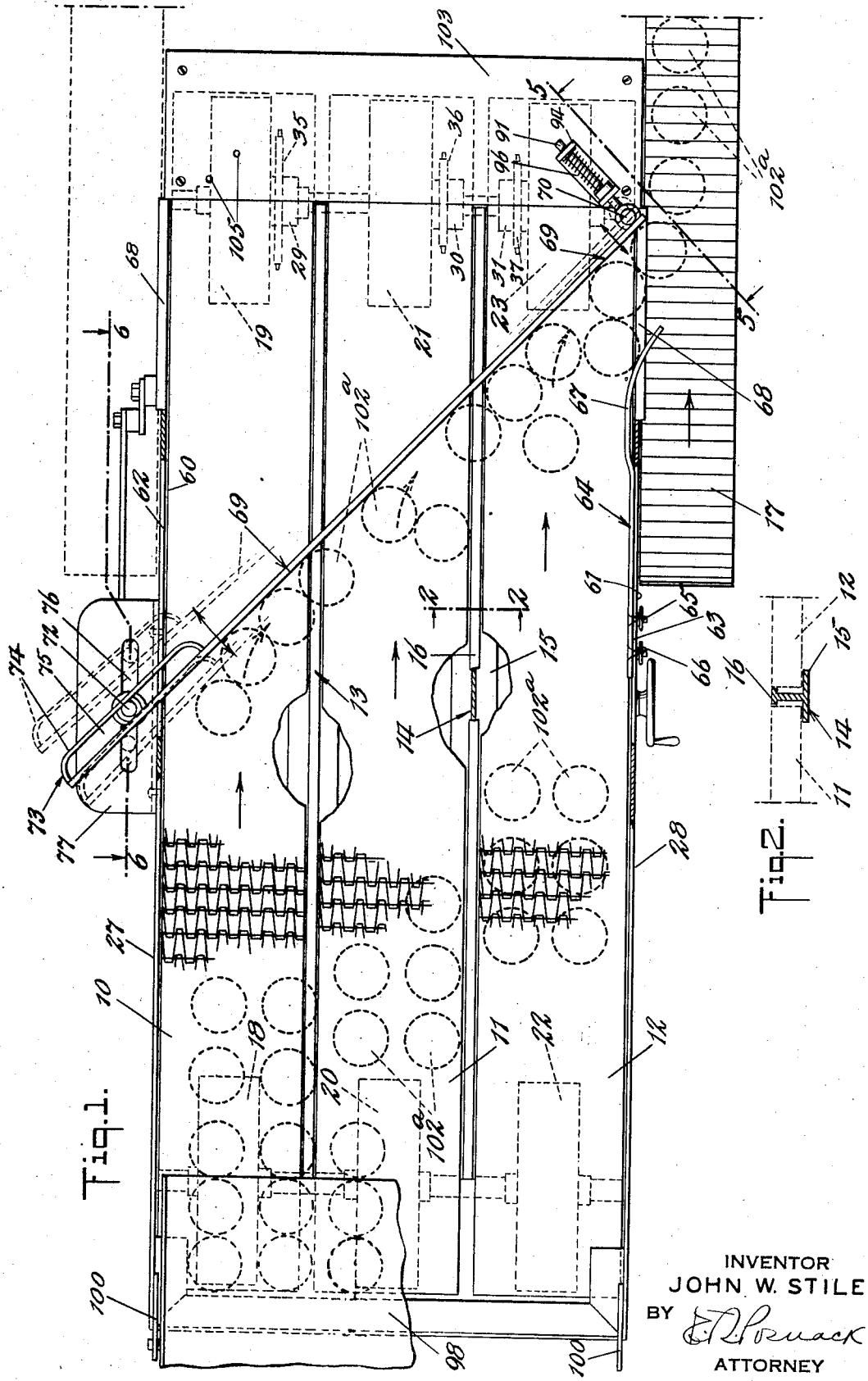
INVENTOR
JOHN W. STILES
BY
ATTORNEY April 6, 1943.    J. W. STILES    2,315,880
CONVEYER FEEDING SYSTEM
Filed April 14, 1942    3 Sheets-Sheet 2

INVENTOR
JOHN W. STILES
BY
ATTORNEY

April 6, 1943. J. W. STILES 2,315,880
CONVEYER FEEDING SYSTEM
Filed April 14, 1942 3 Sheets-Sheet 3
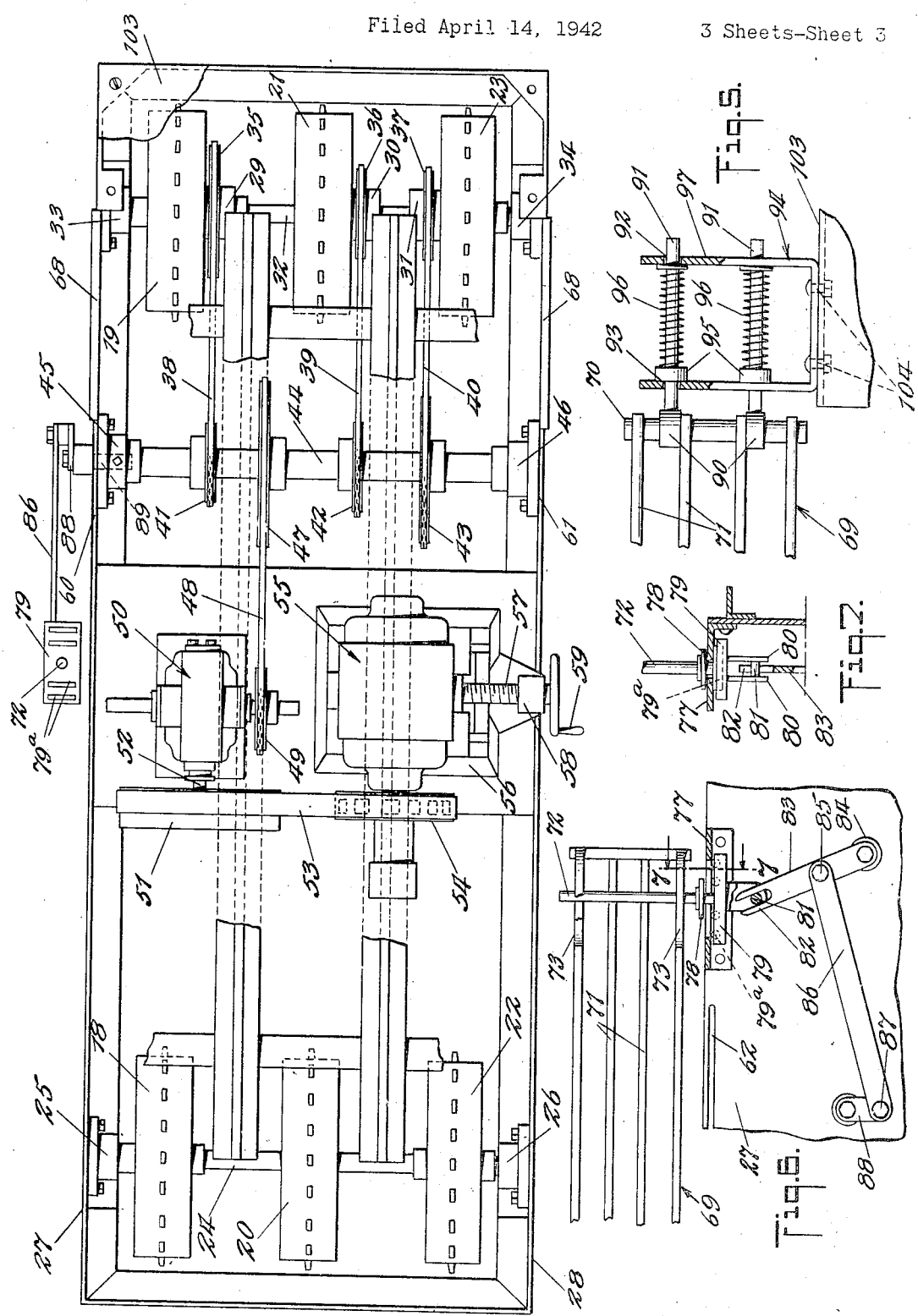
INVENTOR
JOHN W. STILES
BY
ATTORNEY Patented Apr. 6, 1943

2,315,880

UNITED STATES PATENT OFFICE 2,315,880

CONVEYER FEEDING SYSTEM

John W. Stiles, New York, N. Y.

Application April 14, 1942, Serial No. 438,965

8 Claims. (Cl. 198—32)

This invention relates to a conveyer feeding system for discharging upon a conveyer belt a continuous line of units.

In effecting continuous feeds to a main conveyer belt of such units as bottles, jars and containers, the two most commonly employed systems for this purpose embody the so-called rotary and straight-line types of construction. In the former type, a plurality of articles to be fed are placed upon a rotatable table which spins about its axis to discharge the units through a gate onto an adjacent conveyer belt. It has been found that devices of this category cannot be operated at too great a speed in view of the effects of centrifugal force, the articles, particularly when they are relatively tall, being tipped over when the table exceeds certain speed limits. In apparatus of the latter category there is the inherent fault that there are interruptions to the continuous feed of the units to the main conveyer belt, gaps often occurring between successive units. This shortcoming of straight-line feed devices is generally due to the fact that they are not provided with automatic means for causing a continuous succession of units to pass through the gate, making it necessary to employ manual means to accomplish this result. And even when an operator manually feeds the units towards the gate, jamming frequently occurs, causing interruptions, breakage or other trouble. These short comings present in the said conventional feeding systems not only reduce the quantity of units fed, but make it practically impossible to obtain a positive and accurate count of the units based upon a predetermined rate of discharge. It is hence primarily within the contemplation of my invention to obviate the aforesaid shortcomings in a conveyer feeding system, an objective which I accomplish by providing means to automatically feed a continuous and uninterrupted supply of the units to the discharge gate, and by providing oscillating means for preventing a jamming of the units upon discharge to the main conveyer belt.

And in the above-referred-to aspect of my invention, it is a further object to permit a quick loading of the apparatus from cartons containing quantities of the units, and to effectuate an automatic unscrambling of the units for uninterrupted discharge through the gate.

It is a further object of my invention to accomplish the aforesaid objectives in a manner to obviate the necessity of handling the units by the operators, thereby complying with certain sanitary requirements.

It is within the further contemplation of my invention to provide an apparatus of the aforesaid category with means for enabling it to be readily transformed from a right hand to a left hand discharging device, and vice versa.

And it is a further object of this invention to enable the aforesaid objectives to be attained by means of a simple, self-contained and portable unit.

Other objects, features and advantages will appear from the drawings and the description hereinafter given.

Referring to the drawings,

Figure 1 is a plan view of the preferred form of my invention, with parts shown broken away and partially in section, and illustrating the oscillating guide rail in several operative positions.

Figure 2 is a fragmentary sectional elevation of Figure 1 taken along line 2—2.

Figure 4 is a plan view of the apparatus of Figure 1 with the conveyer belts, guide rail and top plate removed.

Figure 5 is an end view of the guide rail and yieldable mounting, looking in the direction of line 5—5 of Figure 1.

Figure 6 is a fragmentary section of Figure 1 taken substantially along line 6—6, and Figure 7 is a fragmentary section of Figure 6 taken along line 7—7.

Figure 3:
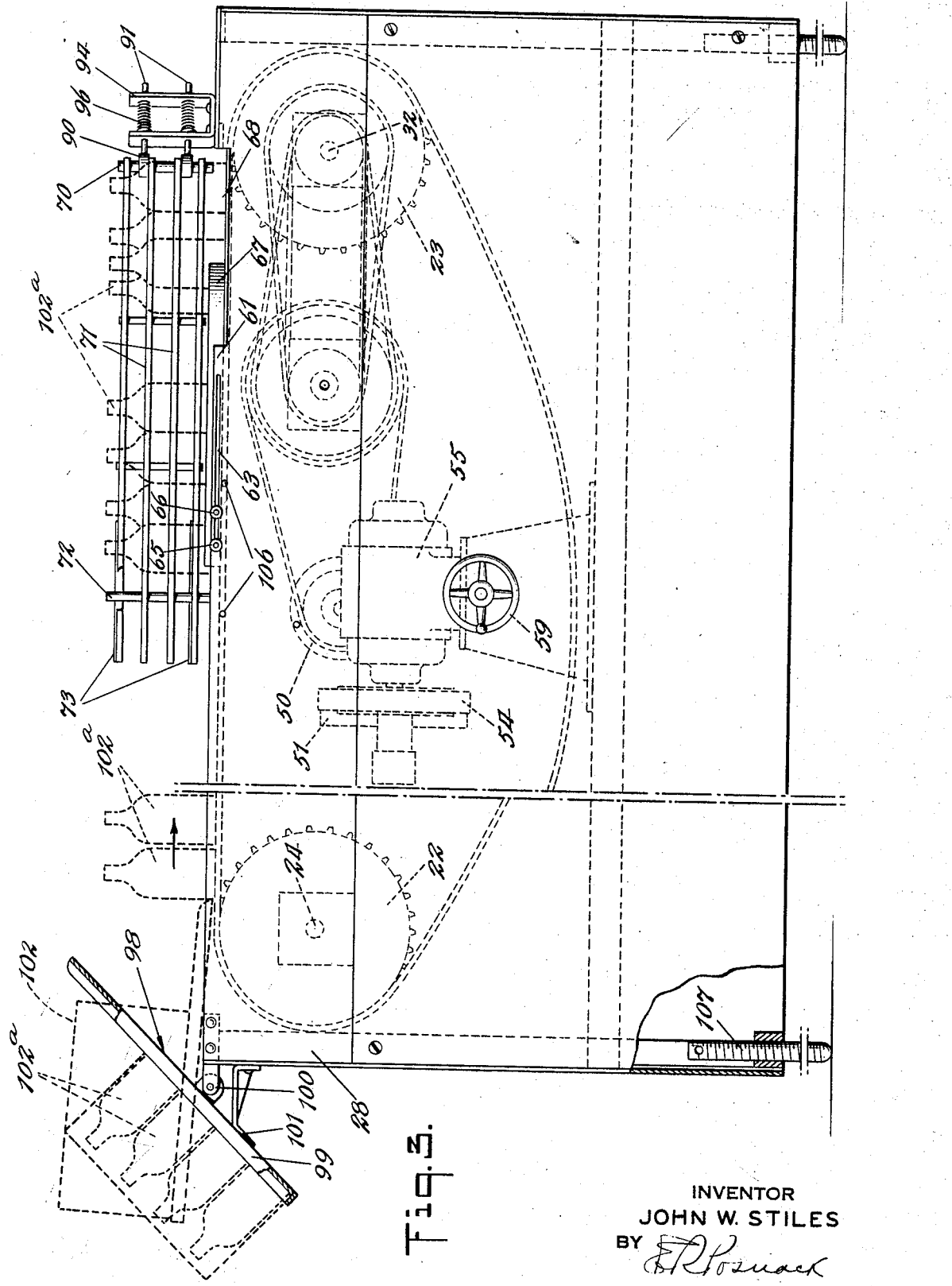
Figure 3 is a side view, with parts broken away for purposes of clarification, of the device of Figure 1, showing the tilting table thereof in its two limiting positions.

In the drawings, the unit constituting the invention contains three continuous feeding belts 10, 11 and 12, these being preferably of the open-link chain type with smooth upper surfaces. Intermediate these belts are the separators 13 and 14, each consisting, in the preferred form, of an I-beam with a lower flange 15 underlying the adjacent belts and a small upper flange 16 at the level of the said conveyor belts, as indicated in Figure 2. These belts are operated, in a manner to be more specifically hereinafter described, at different speeds, the preferred arrangement being such that end belt 10 is operated at a relatively low speed, intermediate belt 11 at a greater speed, and end belt 12 at a higher speed substantially equal to that of the main conveyer belt 17 upon which the units being fed are to be discharged, as will hereinafter appear.

Each of the feed belts is in coactive engagement with two suitable sprocket wheels, belt 10 being in engagement with wheels 18 and 19, belt 11 with wheels 20 and 21, and belt 12 with wheels 22 and 23. Wheels 18, 20 and 22 are rotatably mounted on shaft 24 supported by brackets 25 and 26, suitably secured to walls 27 and 28, respectively, at the sides of the unit. Sprocket wheels 19, 21 and 23 contain hubs 29, 30 and 31, respectively, rotatably mounted upon shaft 32 supported by brackets 33 and 34, respectively, secured to said walls 27 and 28. Fixedly mounted upon said hubs are pulleys 35, 36 and 37, respectively, these pulleys being operatively connected by belts 38, 39 and 40 to coacting pulleys 41, 42 and 43, respectively. Said latter pulleys are fixedly mounted upon driver pulley shaft 44 rotatably supported by bearings 45 and 46 suitably secured to said walls 27 and 28. The ratios of the said coacting pulleys are such that sprocket wheel 19 operates at a relatively slow speed, and wheels 21 and 23 at successively greater predetermined speeds, the speed of sprocket wheel 23 being preferably such that coacting belt 12 will have a linear speed substantially equal to that of main conveyer belt 17.

Fixedly mounted on said shaft 44 is the pulley 47, said pulley being operatively connected by belt 48 with pulley 49 operatively associated with suitable gears in gear reduction box 50. A pulley 51 is fixedly mounted upon shaft 52 associated with said gear reduction box 50, the belt 53 connecting said pulley 51 with expansible pulley 54 rotatably associated with motor 55. Said motor is slidably mounted upon the guide base member 56 and is adapted to move transversely thereon. The framework of the motor is operatively associated with the carrier screw 57 in threaded engagement with stationary bearing 58 and associated with handle 59.

The arrangement is such that upon an operative rotation of said handle, the motor will be moved along guide member 56 transversely with respect to the axis of the motor, thereby varying the distance between the axes of pulleys 54 and 51. When said pulleys are operatively brought closer together, the tension on belt 53 will be reduced, permitting the periphery of expansible pulley 54 to expand; and when the distance between said pulleys is increased, the tension in said belt 53 is increased, thereby causing a contraction of the periphery of pulley 54. In this manner the diametral ratios between pulleys 51 and 54 can be altered for the purpose of controlling the speed of rotation of pulley 51, and consequently of the three driver sprocket wheels 19, 21 and 23 and their associated conveyer belts. The expansible pulley 54 is of conventional construction, and a description thereof will not be given herein inasmuch as it is well known in the art.

The walls or plates 27 and 28, in the preferred form of my invention, each contain vertical extensions 60 and 61 provided with longitudinal slots 62 and 63, respectively. In slidable engagement with one of said extensions, such as extension 61, is the gate member 64 secured in place at a predetermined position by means of the bolt and nut assemblies 65 and 66 coactively associated with said slot 63. In the preferred form of this invention, the said gate contains an outwardly curved discharge portion 67 to provide a discharge aperture 68 between the gate and the discharge side of the oscillating guide rail 69 to be hereinafter described. By suitably adjusting the said gate 64, the width of said opening 68 can be varied in accordance with the size and configuration of the articles to be discharged.

The said guide rail 69 contains, in the preferred form, a pivoting post or hinge 70 operatively supporting a plurality of rail bars 71. The said hinge post 70 is supported, in a manner to be hereinafter described, at the region of discharge opening 68 opposite that of the discharge extremity of gate 64, the said guide rail extending obliquely forwardly across the three feed belts 10, 11 and 12, and therebeyond for coactive association with the vertical oscillator actuating rod 72. The said rod extends through two looped portions 73 of rail 69 preferably at the upper and lower of the bars 71. As will be noted, these looped portions are disposed at the extremity of the guide rail 69 opposite the hinge post 70 and are formed by U-shaped members 74 attached to said bars to form laterally enclosed apertures 75 of a width to permit the oscillator rod 72 to slidably move therealong.

As clearly shown in Figures 6 and 7, said oscillator rod 72 also extends through and is slidably engageable with the walls of the apertured portion 76 disposed within oscillator plate 77 suitably attached to wall 27, apertures 75 and 76 being in intersecting relation. The said apertured portion 76 extends longitudinally of the feed belts 10, 11 and 12. The said rod 72 carries the disc 78 slidably movable upon the upper surface of plate 77, thereby supporting rod 72 in its operative upright position. The said rod is attached at its lower extremity to carrier 79 disposed below plate 77 and in rollable engagement with rollers 79a; and depending from the carrier are the two parallel lugs 80 supporting therebetween the pin 81. Straddling said pin is the bifurcated terminal 82 of the arm 83 rotatably supported at 84 by the wall 27. Pivotally connected to arm 83 at 85 is the link 86, the opposite terminal 87 of said link being attached to the crank arm 88 affixed to shaft 89 fixedly associated with shaft 44. The arrangement is such that upon an operative rotation of said shaft 44, the link 86 and associated parts will be oscillated, rod 72 being reciprocatingly moved within slot 76, thereby causing a corresponding pivotal oscillation of guide rail 69.

The hinge post 70 of guide rail 69 is rotatably supported by hinge rings 90 carried by the rods 91 extending through holes 92 and 93 in the supporting bracket 94. Said rods 91 have affixed thereto the collar 95 to hold the hinge rings 90 and consequently the guide rail 69 against forward movement beyond the predetermined position at which the rail is initially set. Surmounted over the rods 91 are the helical springs 96 disposed between collars 95 and wall 97, thereby permitting a rearward yieldable movement of the hinge rings 90 and consequently of the guide rail 69.

The forward portion of the apparatus is provided with a loading table 98 containing a platform 99 tiltable between loading and unloading positions as indicated in Figure 3. Specifically, the underside of the platform is pivotally secured to the bracket 100 attached to the forward portion of the structure. A stop member 101 serves to support the platform in its receiving position from which it is manually elevated to the unloading position indicated by broken lines in said Figure 3.

In the operation of this apparatus, a box or carton 102 containing therein the units 102a to be conveyed, shown in the drawings as bottles is placed upon the table 98, the underside of the carton being open; and thereafter the table is elevated to the unloading position and the carton slid forwardly over the moving feed belts 10, 11 and 12 to discharge the units 102a upon such belts,—the carton being raised to free the bottles and permit them to freely move upon the belts. According to the preferred arrangement of this invention, the bottles on belt 10 will be moving comparatively slowly, those on belt 11 at a faster rate, and those on belt 12 substantially at the rate at which the main conveyer 17 is moving. As the bottles reach the guide rail 69, they are deflected towards the discharge aperture 68 and discharged on to the main conveyer belt 17.

It is apparent that belt 12 receives bottles not only from the aforesaid carton 102, but also from the belts 10 and 11,—belt 11 receiving its bottles from both the table 98 and belt 10. It is thus obvious that the discharge portion of conveyer belt 12 receives the bottles from several sources, so that there are no gaps between successive bottles passing through the gate. In the conventional structures provided with a single conveyer belt, any gap between the bottles occurring at the time of unloading from the carton would also appear at the discharge portion of the belt. The arrangement of progressively increasing speeds of the three belts also serves to prevent a crowding of the bottles inasmuch as they are not all delivered to the discharge gate at the same time but rather over a period of time determined by the differential in speeds between the belts.

The continuous oscillation of the guide rail 69 has been found to prevent any accidental jamming at the discharge aperture 68. Inasmuch as the maximum movement of the guide rail occurs at the end thereof farthest removed from the gate, the amplitude of oscillation at the gate is relatively small, causing relatively small impulses directed against contiguous bottles. It has been found that these impulses are sufficient to cause a displacement of one of any two abutting bottles attempting to pass through, whereby only one is carried forward to the main conveyer belt 17. It has also been observed that with this arrangement, round or cylindrical bottles are caused to rotate one against the other, thereby facilitating ejection.

It is of course understood that the width of discharge aperture 68 must be adjusted in accordance with the size of the units being discharged, the adjustment taking place by a slidable movement of gate member 64 along extension 61, the bolt and screw assemblies 65 and 66 being suitably manipulated for the purpose.

To further prevent a jamming, the springs 96 come into play, permitting the hinge rings 90 and consequently the guide rail 69 to be yieldably retracted a sufficient amount to permit one of two abutting units at the discharge end to be ejected. Although it has been found that the oscillating action of the guide rail 69 is in itself effective in preventing a jamming, the use of the yieldable hinge arrangement constitutes a greater insurance in this respect and enhances the smooth operation of the device.

My system as above described is therefore capable of automatically feeding, without manual manipulation, a continuous supply of units to the main conveyer belt, and at an uninterrupted and uniform rate, enabling accurate counts to be obtained on the basis of rate of discharge.

It is preferred that the upper surface of belts 10, 11 and 12 be smooth and as frictionless as possible, to permit an easy sliding movement of the units in being transferred from one belt to the other.

It is to be further observed that this apparatus is not necessarily limited for discharging upon a main conveyer belt running parallel with the feeding belts 10, 11 and 12, inasmuch as it can discharge equally as well upon a main belt disposed at right angles to the feeding belts where a terminal receiving portion of the main conveyer belt will be disposed adjacent discharge aperture 68, instead of a lateral portion thereof as shown in Figure 1.

Should it be desired to effect a discharge of the units at the side of the apparatus opposite to that shown in the drawings, such a reversal is possible by a shifting of certain of the elements. The bracket 94 is shown mounted upon rear cover plate 103 and secured at the holes 104. This bracket can be transferred to the opposite side of plate 103, and secured to the holes 105. The plate 77 can be removed from the position indicated on the drawings, and transferred to the opposite side of the device for attachment to wall 28 substantially at the bolt holes 106. The shaft 44 can be detached from the position shown in Figure 4, and reversed; and the co-acting pulleys 35, 36 and 37 and associated parts can correspondingly be reversed in position so that belt 10 will operate at the greatest speed and belts 11 and 12 at successively lower speeds. A gate like 64 can be positioned adjacent the extension wall 60 extending upwardly from wall 27. Upon a reversal of the position of guide rail 69, and an assembly thereof with respect to the coacting parts, it is evident that the discharge can be effected on the side opposite to that shown in the drawings.

It is further to be observed that the entire unit is self-contained, and is readily portable and adjustably supported thereon by legs 107.

It is of course understood that the embodiment above-described and shown in the drawings is illustrative of my invention and is not employed by way of limitation, inasmuch as numerous changes and modifications may be made therein within the scope of the appended claims without departing from the spirit of this invention.

What I claim is:

1. In an apparatus for feeding a main conveyer belt traveling at a predetermined speed, a plurality of parallel adjacent feed belts, unitary loading means extending transversely over the forward portions of all of said feed belts whereby they may all be simultaneously loaded, one of the end feed belts having its outer lateral edge adjacent said main belt, an adjustable discharge gate adjacent the outer edge of said end belt, means to actuate said belts at different predetermined speeds, the speed of said end feed belt being greatest and that of the others decreasing progressively towards the opposite end belt, and a guide rail disposed over and extending obliquely across said feed belts forwardly from a predetermined point behind said gate thereby forming a discharge opening, said gate being adjustably movable with respect to the rail to vary the size of said discharge opening, whereby units of predetermined sizes traveling on said feed belts will be deflected by said guide rail from the slower to the faster moving belts and towards said opening for discharge upon said main conveyer belt.

2. In an apparatus for feeding a main conveyer belt, a plurality of parallel adjacent feed belts, means to actuate said belts at various predetermined speeds, loading means disposed over the forward portions of each of said feed belts whereby they may all be simultaneously loaded, an open discharge gate adjacent one of the end belts and in close proximity to said main conveyer belt, and a guide rail yieldably mounted behind said gate and extending obliquely and forwardly therefrom across said feed belts, whereby units traveling on said feed belts will be deflected by said guide means towards said gate and discharged upon said main conveyer belt.

3. In an apparatus for feeding a main conveyer belt, a plurality of parallel adjacent feed belts, means to actuate said belts at various predetermined speeds, loading means disposed over the forward portions of each of said feed belts whereby they may all be simultaneously loaded, an open discharge gate adjacent one of the end belts and in close proximity to said main conveyer belt, a guide rail mounted behind said gate and extending obliquely and forwardly therefrom across said feed belts, yieldable means associated with the mounting for said rail for yieldably permitting a rearward movement of said rail, and stop means for holding the rail at the said mounting thereof against forward movement, whereby units of predetermined proportions traveling on said feed belts will be deflected by said guide rail towards said gate and discharged upon said main conveyer belt.

4. In an apparatus for feeding a main conveyer belt, a plurality of parallel adjacent feed belts, means to actuate said belts at various predetermined speeds, loading means disposed over the forward portions of each of said feed belts whereby they may all be simultaneously loaded, an open discharge gate adjacent one of the end belts and in close proximity to said main conveyer belt, a guide rail yieldably and pivotally mounted behind said gate and extending obliquely and forwardly therefrom across said feed belts, and oscillating means pivotally actuating said rail about its mounting, whereby units of predetermined proportions traveling on said feed belts will be deflected by said guide rail towards said gate and discharged upon said main conveyer belt.

5. In an apparatus for feeding a main conveyer belt, a plurality of parallel adjacent feed belts, means to actuate said belts at various predetermined speeds, an open discharge gate adjacent one of the end belts and in close proximity to said main conveyer belt, a guide rail disposed over and extending obliquely across said feed belts forwardly from a predetermined point behind said gate, said rail containing a hinge post in the region of said gate, and a mounting associated with said post comprising a bracket member, hinge rings in rotatable and supporting engagement with said post, horizontal rods carrying said hinge rings and slidably supported by said bracket member, spring means coactively associated with said rods and bracket member for yieldably allowing a rearward movement of the hinge rings and rail, and stop means for limiting the forward movement of the said rods and the parts carried thereby, whereby units of predetermined proportions traveling on said feed belts will be deflected by said guide rail towards said gate and discharged upon said main conveyer belt.

6. In an apparatus for feeding a main conveyer belt, a plurality of parallel adjacent feed belts, driving means to actuate said belts at various predetermined speeds, an open discharge gate adjacent one of the end belts and in close proximity to said main conveyer belt, a guide rail pivotally mounted behind said gate and extending obliquely and forwardly therefrom across said feed belts a predetermined distance therebeyond, a vertical oscillator rod in slidable engagement with the terminal portion of the rail opposite its pivotal mounting, slotted guide means extending substantially longitudinally of the feed belts and in slidable engagement with said rod, and eccentric means operatively connecting said driving means with said rod, whereby said rail will be oscillated about its pivotal mounting and units traveling on said feed belts will be deflected by said guide rail towards said gate and discharged upon said main conveyer belt.

7. In an apparatus for feeding a main conveyer belt, a plurality of parallel adjacent feed belts, means to actuate said belts at various predetermined speeds, a casing containing said feed belts and actuating means, at least one of the lateral walls of said casing containing at the upper edge thereof a vertical extension, a gate member in slidable engagement with said extension and movable substantially longitudinally therealong, releasable securing means for adjustably securing said gate member to said extension, the rear portion of said gate member being outwardly curved and disposed in close proximity to said main conveyer belt, and guide means disposed over and extending obliquely across said feed belts forwardly from a point a predetermined distance behind said gate member, whereby units traveling on said feed belts will be deflected by said guide means towards said gate for discharge upon said main conveyer belt.

8. In an apparatus for feeding a main conveyer belt, a plurality of parallel adjacent feed belts, means to actuate said belts at various predetermined speeds, a casing containing said feed belts and actuating means, the actuating means for the feed belts containing a motor, a driving wheel coactively associated with each of said feed belts, a wheel-supporting shaft rotatably supporting said wheels at predetermined positions thereon, said shaft extending transversely of the casing and being detachably and reversibly secured to the lateral walls thereof, and an intermediate drive shaft operatively connecting said motor with each of said driving wheels, said intermediate shaft being rotatably and reversibly secured to the said lateral walls of the casing, said lateral walls each containing at the upper edges thereof a vertical extension, a gate member in slidable engagement with one of said extensions and provided with releasable securing means for adjustably securing said gate member to the extension, a guide rail adapted to be pivotally mounted at a predetermined point behind said gate member and extending obliquely and forwardly therefrom across said feed belts, a cover plate over said casing to the rear of said guide rail, the pivotal mounting for the rail containing hinge means and a bracket supporting such means, said bracket being supportable by said cover plate at predetermined portions at either of the lateral sides thereof, thereby permitting a reversal of the position of the bracket, oscillator actuating means associated with said intermediate shaft and said guide rail opposite the pivotal terminal thereof for imparting an oscillatory movement of the rail about is mounting, and means at each of said lateral walls for operatively supporting said oscillator actuating means when operatively positioned thereat, whereby the apparatus can be operated for either right hand or left hand feeding.

JOHN W. STILES.